(No Model.)
W. CUTLER.
CONSTRUCTION OF FERMENTING SQUARES AND VATS.
No. 599,599. Patented Feb. 22, 1898.
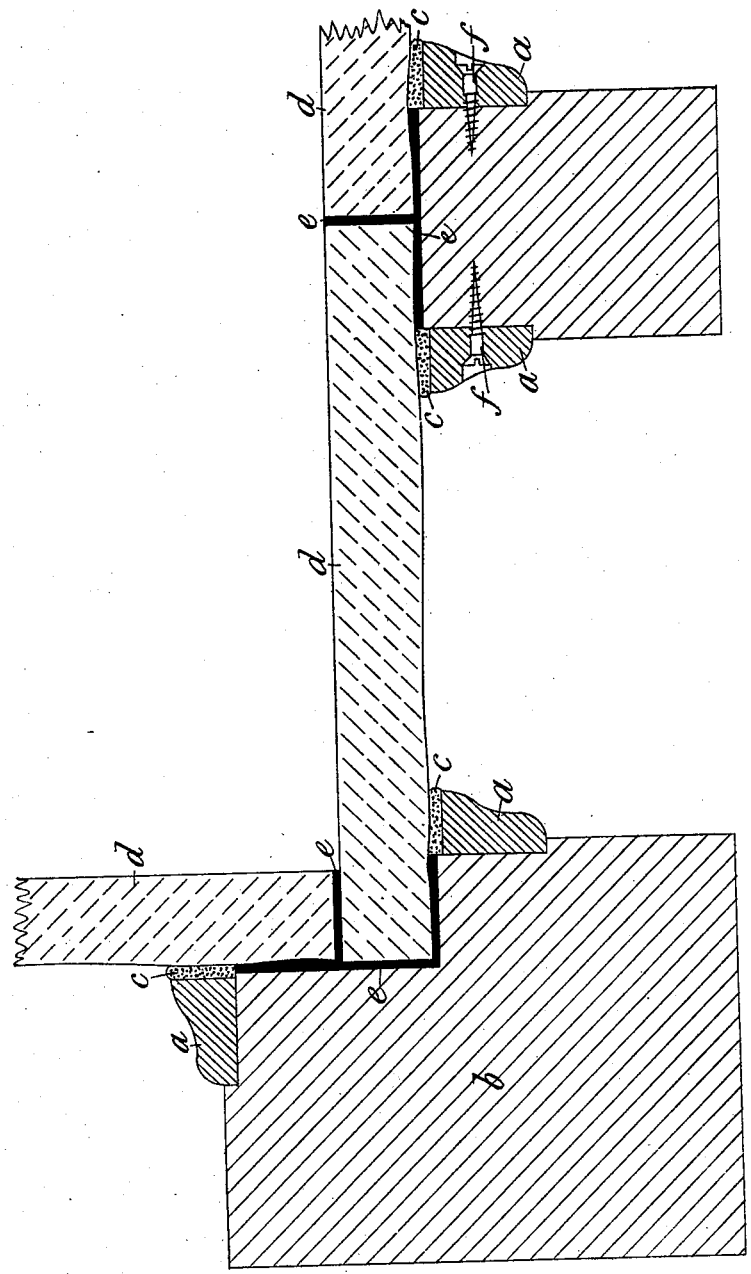
Witnesses
Inventor
William Cutler
By James L. Norris
Atty

UNITED STATES PATENT OFFICE.

WILLIAM CUTLER, OF BIRMINGHAM, ENGLAND.

CONSTRUCTION OF FERMENTING SQUARES AND VATS.

SPECIFICATION forming part of Letters Patent No. 599,599, dated February 22, 1898.

Application filed September 10, 1897. Serial No. 651,198. (No model.) Patented in England November 4, 1896, No. 24,618.

*To all whom it may concern:*

Be it known that I, WILLIAM CUTLER, manufacturer, a subject of the Queen of Great Britain, residing at Cannon Works, Constitution Hill, Birmingham, in the county of Warwick, England, have invented Improvements in the Construction of Fermenting Squares and Vats or Troughs Used in Brewing, (for which I have obtained a patent in Great Britain, No. 24,618, bearing date November 4, 1896,) of which the following is a specification.

The object of my invention is to prevent the cracking and breaking of the glass pieces or panels of squares and vats or troughs when made of glass. The glass used for this purpose is level on one side only, the other or uneven side being that side that is placed in contact with the framing of the vat. The usual method of fixing the glass panels to the framing was by means of putty or red or white lead, in which the panel was bedded; but this material, while forming a fluid-tight connection, was not sufficiently firm to resist the internal pressure caused by the weight of the liquor. Hence an unequal supporting-bed being present the glass panels cracked or broke even when made of excessive thickness. This construction of vats has accordingly been given up by the brewers, although capable of producing a better effect on the liquor than in ordinary vats. This breaking and cracking of the glass panels I obviate by providing a firm bed, and which bed also coincides with the uneven surface of the glass, whereby a perfectly continuous supporting medium is presented to the glass.

I fit fillets or beads *a*, of metal, wood, or other suitable material, to the wooden frame *b* of the trough and fill the intervening space between the fillet and the glass with a suitable plastic material *c*, such as cement, which when set or dry provides an even bearing to the glass. The glass *d* is fixed in the usual manner by bedding in white or red lead, putty, or other suitable material *e*; but instead of relying on these materials as a bearing for the glass I now utilize them for making a fluid-tight joint only and rely on the fillets or beads *a*, with the packing *c*, as the bearing medium.

The fillets or beads *a* may, if found necessary, be made adjustable and are secured to the frame *b* by screws *f* or by other suitable means.

I claim—

In a brewing vat or trough, the combination with the frame, of glass panels inserted therein, beads or fillets fastened to the frame adjacent to the glass panels, a waterproof packing interposed between the edges of the glass panel and the frame, and a packing of cement disposed between the frame and the beads or fillets, substantially as described.

Dated this 27th day of August, 1897.

WILLIAM CUTLER.

Witnesses:
ERNEST HARKER,
FRANK H. SOUTHAM.